H. R. SARGENT.
ELECTRIC TIME SYSTEM.
APPLICATION FILED JULY 27, 1915.
1,201,637.
Patented Oct. 17, 1916.
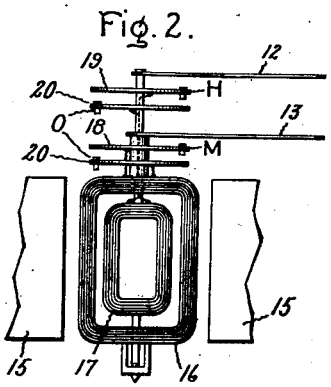
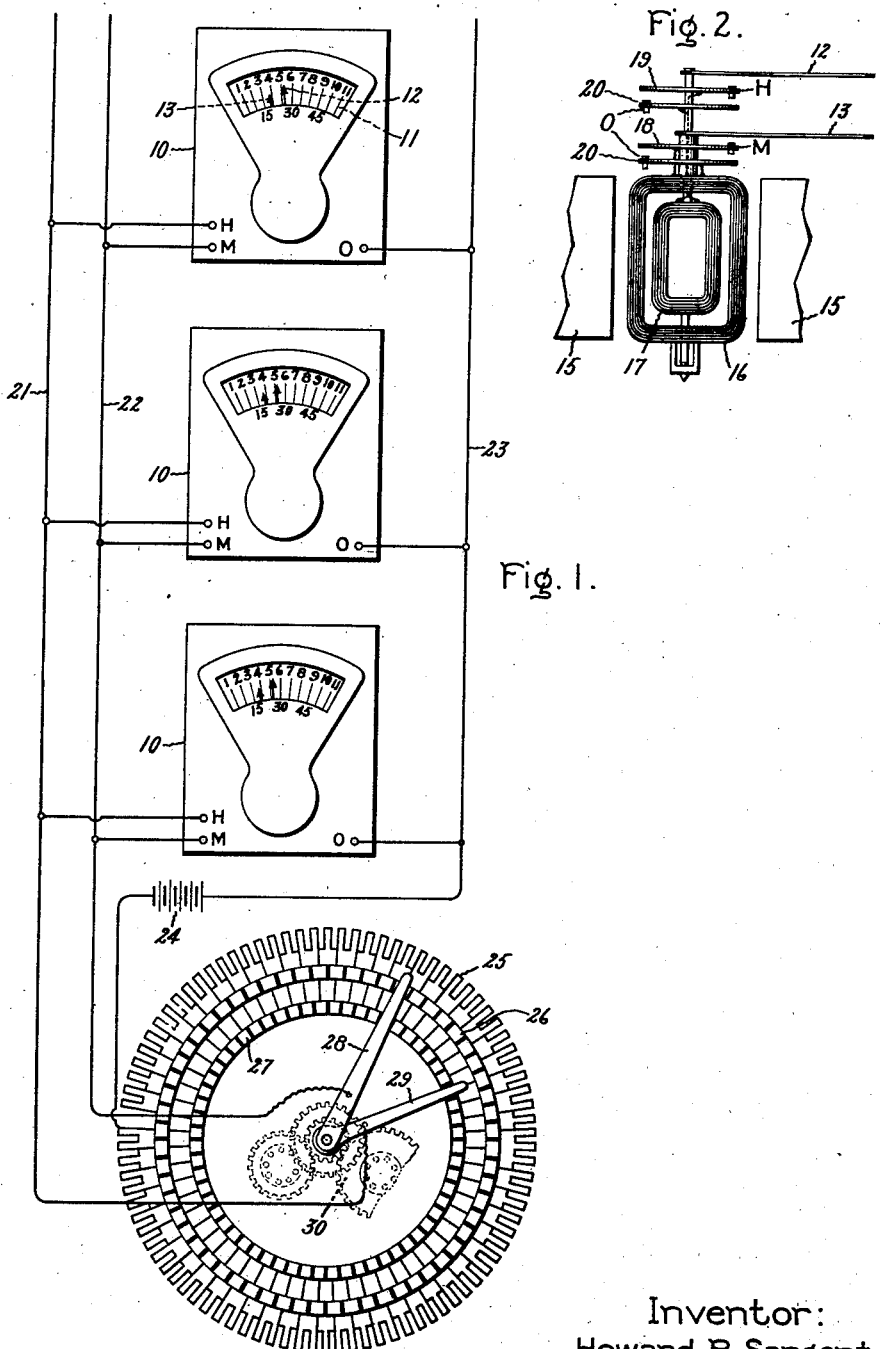
Inventor:
Howard R. Sargent,
by *Albert G. Davis*
His Attorney.

UNITED STATES PATENT OFFICE.

HOWARD R. SARGENT, OF SCHENECTADY, NEW YORK, ASSIGNOR TO GENERAL ELECTRIC COMPANY, A CORPORATION OF NEW YORK.

ELECTRIC TIME SYSTEM.

1,201,637.  Specification of Letters Patent.  Patented Oct. 17, 1916.

Application filed July 27, 1915. Serial No. 42,197.

*To all whom it may concern:*

Be it known that I, HOWARD R. SARGENT, a citizen of the United States, residing at Schenectady, in the county of Schenectady, State of New York, have invented certain new and useful Improvements in Electric Time Systems, of which the following is a specification.

My invention relates to electric time systems, such, for example, as an electric clock system.

The object of my invention is to provide a novel and improved electric time system, and particularly an improved electric clock system.

More specifically, the object of my invention is to provide an improved system of electrically operated secondary clocks, or time-measuring or indicating devices, adapted to be controlled by a master clock, or other suitable primary time-keeping mechanism.

The novel features which I believe to be patentably characteristic of my invention are definitely indicated in the claims appended hereto.

The principle of my invention and its embodiment in an electric clock system and the mode of operation of such a system will be understood from the following description taken in connection with the accompanying drawings, in which:—

Figure 1 is a diagrammatic view of an electric clock system embodying my present invention, and Fig. 2 is a diagrammatic detail view of the secondary clock construction.

My invention in its broad aspect comprises an electro-responsive device having a movable element adapted to occupy a position depending upon the magnitude of the electric current flowing in the device, and a time-actuated mechanism for varying the magnitude of the current flowing in the device as a function of time. The electro-responsive device may conveniently take the form of an electrical measuring instrument, such, for example, as an electric voltmeter of the D'Arsonval type. Such an instrument comprises a movable element having a current-carrying coil mounted in a magnetic field of constant strength, usually produced by a permanent magnet. The position of the movable element depends upon the magnitude of the current flowing in the current-carrying coil, and hence upon the voltage impressed upon the terminals of the coil. In accordance with my present invention, I propose to provide such an instrument with a dial graduated in units of time, that is, in hours, minutes, seconds, or the like, or in any combination of these units, such as hours and minutes. The movable element of the instrument is provided with the usual pointer or hand which coöperates with the dial to indicate time. The instrument is connected in an electric circuit, including a source of electric energy, and the magnitude of the current flowing through the current-carrying coil is varied by any suitable time-keeping mechanism, such as a master clock, so that the movement of the hand or pointer across the dial is a measure of time.

In the accompanying drawings, I have illustrated my invention in an electric clock system, where the electro-responsive devices are arranged to indicate hours and minutes. It will of course be understood that the invention is diagrammatically illustrated for the purposes of explanation, and I do not wish to be limited to the particular embodiment or application shown or the particular arrangement of the apparatus. The system includes a plurality of electro-responsive devices 10, shown as of the electric voltmeter type, adapted to be located in different places for indicating time. Each device is in the nature of a secondary clock, and is operatively connected in an electric circuit, in which the magnitude of the current-flow is controlled by a suitable primary time-keeping mechanism, or master clock. Each electro-responsive device has a sector-shaped dial 11 having two series of numerals, one for indicating hours and the other for indicating minutes. Two hands, one an hour hand 12 and the other a minute hand 13, are adapted to move across the dial. The position which the hands occupy in Fig. 1 of the drawings indicates 19 minutes after 5.

Each electro-responsive device comprises a permanent magnet 15 and two independently movable elements 16 and 17, having concentric current-carrying coils of the well known D'Arsonval instrument type. Electric current is conducted to the coils by means of the control springs 18, 19 and 20 in the usual manner. The hour hand 12 is attached to the movable element 17 while the minute hand 13 is attached to the other movable element 16. Each device is provided with three terminals marked H, M and O. The terminal H is connected to one end of the current-carrying coil of the moving element 17 to which the hour hand 12 is attached, while the terminal M is attached to one end of the current-carrying coil of the movable element 16 to which the minute hand 13 is attached. The other ends of both of the current-carrying coils are connected to the common terminal O. The terminals H, M and O are connected to conductors 21, 22, and 23, respectively, of an electric circuit. A source of electric energy, such as a storage battery 24, is included in the electric circuit.

A resistance 25 having a plurality of intermediate taps brought out to the segments of two commutators 26 and 27 is included in the electric circuit of the system for varying the magnitude of the current flowing in the two current-carrying coils of each of the devices 10. Time-actuated contact arms 28 and 29 are adapted to move over the commutators 26 and 27, respectively. These contact arms may be driven by any suitable time-keeping mechanism, such as a master clock, a constant speed electric motor, or the like. In the drawings, I have diagrammatically illustrated a clockwork mechanism 30 for actuating the contact arms. The conductor 21 is electrically connected to contact arm 29, while the conductor 22 is electrically connected to contact arm 28. The conductor 23 is connected to one end of the resistance 25.

The operation of the system is as follows. The time-keeping mechanism 30 drives the contact arms 28 and 29 in a clockwise direction, the arm 28 moving twelve times as fast as the arm 29. Clockwise movement of the arms 28 and 29 cuts out at predetermined intervals of time definite portions of the resistance 25, and thus increases the potential impressed upon the terminals of the current-carrying coils of the devices 10, thereby increasing the magnitude of the current flowing in these coils. In the particular example illustrated, the contact arm 28 cuts out every minute a definite portion of the resistance 25 in the circuit of the current-carrying coil of the minute hand of the devices 10. The amount of resistance cut out each minute is so proportioned that the minute hand 13 moves each minute 1/60 of the total angle suspended by the sector shaped dial 11. Similarly, the arm 29 at twelve minute intervals cuts out of the circuit of the current-carrying coil of the hour hand 12 that amount of resistance necessary to move the hour hand 1/60 of the angle suspended by the dial.

I have illustrated a rheostatic means for impressing on the conductors 21—23 and 22—23 a variable voltage in accordance with the principle of my present invention, but it will of course be understood that the variable voltage may be produced or generated in any other suitable manner. For example, the time-actuated rheostatic means illustrated might be employed to vary the exciting or field current of suitable direct-current generators, so that the produced E. M. F.'s vary as the necessary function of time.

While I have illustrated my invention as applied to an electric clock system, it will of course be understood that the same may be equally well employed in any case where it is desired to effect an action at a plurality of different places at predetermined periods of time, as for example in time-switching systems. I do not, therefore, wish to be restricted to the particular application or arrangement of apparatus disclosed herein by way of example for the purpose of setting forth my invention in accordance with the patent statutes, but aim in the appended claims to cover all changes and modifications within the spirit and scope of my invention.

What I claim as new and desire to secure by Letters Patent of the United States, is:—

1. An electric clock system comprising an electroresponsive time-indicating device adapted to be actuated by an electric current varying as a predetermined function of time, and means for supplying to said device an electric current varying as said predetermined function of time.

2. An electric clock system comprising an electroresponsive device, time-indicating means operatively related to said device and adapted to be actuated by the flow through the device of an electric current varying as a predetermined function of time, and means for supplying to said device an electric current varying as said predetermined function of time.

3. An electric clock system comprising an electroresponsive time-indicating device adapted to be actuated by an electric current varying as a predetermined function of time, an electric circuit including a source of electric energy operatively related to said device, means for varying the magnitude of the electric current flowing in said circuit, and a time-actuated mechanism for controlling said last mentioned means.

4. An electric clock system comprising a plurality of electro-responsive devices, time-indicating means operatively related to each of said devices and adapted to be actuated by the flow through the device of an electric current varying as a predetermined function of time, an electric circuit including a source of electric energy operatively related to said devices, means for varying the magnitude of the electric current flowing in said circuit, and a master clock coöperating with said last mentioned means for varying the current flowing in said circuit as said predetermined function of time.

5. An electric clock system comprising a plurality of electric current responsive devices, time-indicating means operatively related to each of said devices and adapted to be actuated by the flow of electric current in the device, and means for varying the current flowing in said devices as a predetermined function of time.

6. An electric clock system comprising a plurality of electric current responsive devices, each of said devices being provided with time-indicating means responsive to the magnitude of the electric current flowing in the device, and a time-actuated mechanism for controlling the quantity of electric current flowing in said devices.

7. An electric clock system comprising a plurality of electric current responsive devices, each of said devices having two movable hands adapted to move across a dial graduated in units of time, the position of said hands with respect to the coöperating dial depending upon the magnitude of the electric current flowing through the device, and a time-actuated mechanism for controlling the magnitude of the electric current flowing in said devices.

8. An electric clock system comprising a plurality of electrical measuring instruments having time-indicating means adapted to be actuated by an electric current varying as a predetermined function of time, an electric circuit including a source of electric energy operatively related to said devices, means for varying the magnitude of the electric current flowing in said circuit, and time-actuated means coöperating with said last mentioned means for varying the magnitude of the current flowing in said circuit as said predetermined function of time.

9. An electric clock system comprising a plurality of electric current responsive devices, each of said devices having two movable elements, an indicating hand secured to each element of said devices, a dial graduated in units of time operatively related to the hands of each device, the hands and dial of each device coöperating to indicate time when the current flowing through the device varies as a predetermined function of time, an electric circuit including a source of electric energy operatively related to said devices, means for varying the magnitude of the electric current flowing in said circuit, and time-actuated means coöperating with said last mentioned means for varying the magnitude of the current flowing in said circuit as said predetermined function of time.

10. An electric clock system comprising an electric current responsive device having a movable element, a hand secured to said movable element, a dial coöperating with said hand to indicate time, an electric circuit including a source of electric energy operatively related to said device, and time-actuated means for increasing at predetermined time intervals the electric energy supplied to said device so that the movement of said hand across said dial is a measure of time.

11. An electric time system comprising an electric current responsive device having a movable element with an initial position, a hand secured to said movable element, the position of said element with respect to its zero-position being a function of the quantity of electric energy supplied to said device, an electric circuit including a source of electric energy operatively related to said device, and time-actuated means for varying at predetermined time intervals the quantity of electric energy supplied to said device so that the movement of said hand is a measure of time.

12. An electric clock system comprising an electric current responsive device having two independently movable elements, a hand secured to each movable element, a dial graduated in units of time and coöperating with said hands to indicate time, an electric circuit including a source of electric energy operatively related to said device, and time-actuated means for controlling the supply of electric energy to said device so that the movement of one element is a measure of minutes and the movement of the other element is a measure of hours.

13. An electric clock system comprising a plurality of electric current responsive devices, each of said devices having two movable elements, each element being provided with a current carrying coil, an indicating hand secured to each element of said devices, a dial graduated in units of time operatively related to the hands of each device, the hands and dial of each device coöperating to indicate hours and minutes of time, means including a source of electric energy for supplying electric energy to each coil of each device, and time-actuated means for controlling the supply of electric energy to said current carrying coils so that the movement of one hand of each device is a measure of minutes and the movement of the other hand is a measure of hours.

In witness whereof, I have hereunto set my hand this 26th day of July, 1915.

HOWARD R. SARGENT.

Witness:
HELEN ORFORD.